United States Patent
Mihatsch

(10) Patent No.: US 9,194,478 B2
(45) Date of Patent: Nov. 24, 2015

(54) METHOD FOR DETECTING THE ORIGIN POSITION OF A SHIFT ELEMENT

(71) Applicant: ZF Friedrichshafen AG, Friedrichshafen (DE)

(72) Inventor: Georg Mihatsch, Lindau (DE)

(73) Assignee: ZF FRIEDRICHSHAFEN AG., Friedrichshafen (DE)

(*) Notice: Subject to any disclaimer, the term of this patent is extended or adjusted under 35 U.S.C. 154(b) by 0 days.

(21) Appl. No.: 14/510,627

(22) Filed: Oct. 9, 2014

(65) Prior Publication Data

US 2015/0105986 A1    Apr. 16, 2015

(30) Foreign Application Priority Data

Oct. 11, 2013  (DE) .......................... 10 2013 220 571

(51) Int. Cl.
*F16H 61/04*  (2006.01)
*F16H 57/01*  (2012.01)

(52) U.S. Cl.
CPC .......... *F16H 57/01* (2013.01); *F16H 2057/012* (2013.01)

(58) Field of Classification Search
CPC ................ B60W 10/02; B60W 10/10; B60W 2510/0225; B60W 2510/02; B60W 2710/02; B60W 2710/022; F16H 61/0403; F16H 2061/0474; F16H 2061/1276; F16H 2061/1288; F16H 2061/1208; F16H 2061/1256; F16D 2021/0653; F16D 2023/0693; F16D 25/10; F16D 25/14; F16D 2500/5012; F16D 2500/5116; F16D 2500/70217; F16D 2500/70406; F16D 2500/7041

See application file for complete search history.

(56) References Cited

U.S. PATENT DOCUMENTS

| 6,656,090 | B2* | 12/2003 | Matsumura et al. .......... 477/171 |
| 8,989,974 | B2* | 3/2015 | Arnold et al. .................... 701/55 |
| 2009/0249777 | A1* | 10/2009 | Popp et al. ....................... 60/469 |
| 2009/0250310 | A1* | 10/2009 | Popp et al. ................... 192/85 R |
| 2010/0081547 | A1* | 4/2010 | Kobayashi et al. ........... 477/156 |
| 2013/0220053 | A1 | 8/2013 | Novak |
| 2013/0268168 | A1 | 10/2013 | Arnold et al. |

FOREIGN PATENT DOCUMENTS

| DE | 10 2010063027 A1 | 6/2012 |
| DE | 10 2012202903 A1 | 8/2013 |

OTHER PUBLICATIONS

German Search Report, Dated Oct. 11, 2013 (7 pages).

* cited by examiner

*Primary Examiner* — Edwin A Young
(74) *Attorney, Agent, or Firm* — Dority & Manning, P.A.

(57) ABSTRACT

A method for recording an initial position of at least one positive-locking shifting element of a transmission of a vehicle is proposed, whereas an initial position of the shifting element is determined and assigned depending on a recorded operating pressure curve for the actuation of the shifting element.

8 Claims, 2 Drawing Sheets

METHOD FOR DETECTING THE ORIGIN POSITION OF A SHIFT ELEMENT

FIELD OF INVENTION

This invention relates generally to a method for recording an initial position of a positive-locking shifting element.

BACKGROUND

It is known from vehicle technology that, for automatic transmissions in particular, positive-locking shifting elements, such as claw couplings or claw brakes, are used (among other things). A pressure sensor is provided for detecting relative movements of the shifting elements; this records the operating pressure of the respective shifting element. Based on the recording of the operating pressure, the relative movements of the shifting element can be detected.

However, if the actual current starting position of the shifting element, referred to below as the "initial position," is known, whether the shifting element is in an end stop position cannot be determined on the basis of the detection of movements by the pressure sensor. In addition, the end stop position in which the shifting element is possibly found cannot be detected.

This invention is subject to the task of proposing a method of the type described above for which the initial position is determined.

SUMMARY OF THE INVENTION

Thus, a method for determining an initial position for at least one shifting element in accordance with an exemplary embodiment of the invention is proposed, with which an initial position is determined and assigned through the recording of the operating pressure curve for the actuation of the particular shifting element. Using the initial position determined on the basis of the operating pressure curve, for example upon subsequent movements of the shifting element, a statement can be made regarding the direction in which the shifting element is moving, in particular whether the shifting element is open or closed.

If the operating pressure recorded by the pressure sensor is, for a predetermined time, below an applicable threshold value, it can be assumed that the shifting element or the shifting claw is in the position that is predefined by the current supply of the shifting element. This current setting or position is assigned to the respective shifting element. Preferably, the assignment of the particular position may be carried out upon each engine start, or if the transmission has become unpressurized.

According to one possible embodiment of the invention, it may be provided that the assignment of the initial position takes place, for example, in three steps or phases. In a first step, the shifting element is supplied with current and subjected to operating pressure, such that the shifting element moves from the end stop position, which is detected through the increased operating pressure recorded by the pressure sensor. After a certain transient phase, the curve of the operating pressure is recorded. If the operating pressure falls below a predetermined pressure threshold within a predetermined period of time, the initialization phase ends and the position is assigned to the shifting element.

However, if the operating pressure remains above the threshold value even after the expiration of the period of time or the predetermined time interval, a measure provided within the framework of the second step is carried out, in order to determine whether there is a defect in the shifting element. Within the framework of this action, it can be provided, for example, that all shifting elements of the transmission are opened. Thereby, all positive-locking shifting elements also proceed in the open position. If, within the framework of this measure, the operating pressure does not fall below the predetermined threshold value, a defect is detected in a third step, such that a hydraulically, mechanically or electrically defective system is to be assumed, and the current position of the shifting elements is not able to be determined.

Additional objectives and advantages of the invention set will be set forth in part in the following description, or may be obvious from the description, or may be learned through practice of the invention.

BRIEF DESCRIPTION OF THE DRAWINGS

In the following, this invention is further discussed on the basis of the drawings. The following is shown.

DETAILED DESCRIPTION

Figure 1:
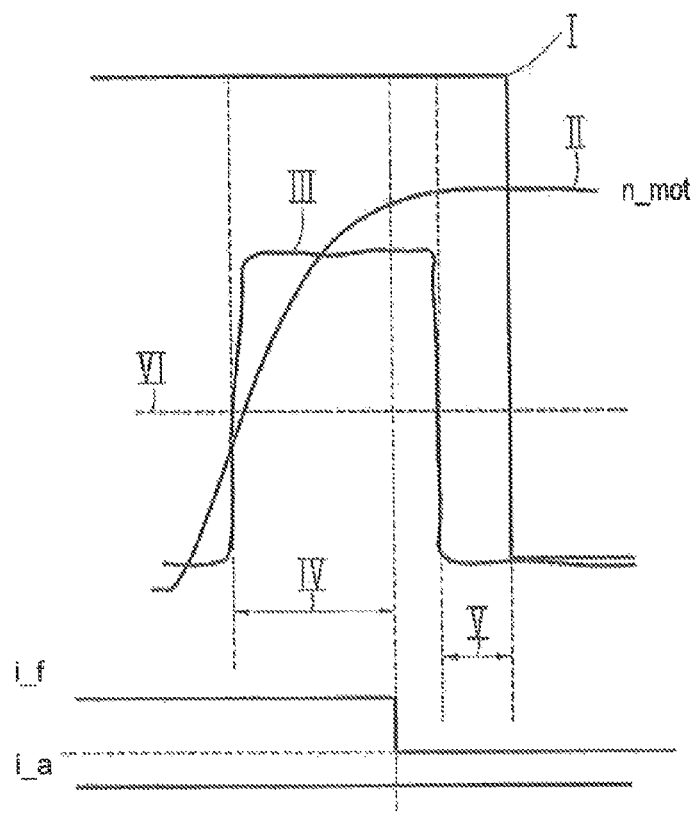
FIG. 1 a flow chart of an exemplary embodiment of a method in accordance with the invention for determining an initial position of a shifting element.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Various curves are shown in FIG. 1. The curve I shows the respective state during the sequence of the method in accordance with exemplary aspects of the invention for detecting the position of the shifting elements, which are designated, for example, as claw A and claw F. With II, the rotational speed curve of the engine n_mot is designated, whereas the curve III designates the curve of the operating pressure that is recorded by the pressure sensor. In addition, through the curves i_f and i_a, the respective operating state or the respective operating position of the two positive-locking shifting elements A and F is identified.

Figure 2:
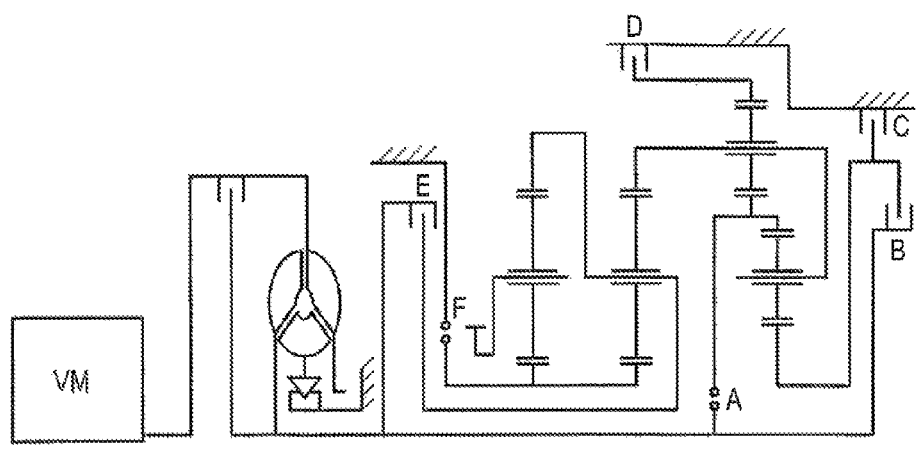
FIG. 2 an exemplary wheel set diagram of a transmission, with which the method is able to be used.

Preferentially, the method that is described and claimed may be used in a 9-speed automatic transmission, an example of which is shown in FIG. 2. The 9-speed automatic transmission is connected to an internal combustion engine VM through a torque converter. The transmission is carried out in planetary design and includes, for example, four planetary gear sets, which are connected to each other through multiple shafts. In addition to, for example, four frictional-locking shifting elements B, C, D and E, for example, two positive-locking shifting elements are provided as claw couplings A and F. However, the method may also be used with other transmissions.

Within the framework of the method in accordance with exemplary aspects of the invention, the position assigned through the current setting for the particular shifting element A, F is detected as an initial position, if the operating pressure is below an applicable threshold value VI for a predetermined time interval V. The shifting element A, F is subjected to the operating pressure through a corresponding current setting; this is evident from the curve III in FIG. 1. With IV, the transient phase is designated. The operating pressure curve III is evaluated after the end of the transient phase IV. This occurs in the manner that the operating pressure for a predetermined time interval V falls below an applicable threshold value, or below an applicable pressure threshold value VI. At that point, the process ends, and the corresponding end stop position allocated through the current setting is assigned as the initial position.

If, after the expiration of the predetermined time interval V, the operating pressure remains above the applicable threshold value VI, a second phase 2 begins at the end of the transient phase IV; with this, all shifting elements A to F are opened. If, at the end of the predetermined time interval V, the operating pressure remains above the threshold value VI, a defect at the shifting element A to F is detected.

It is evident from the curve I that the position of the shifting elements or the claws A, F may not be detected until the end of the predetermined time interval V. This is identified in the curve I by the high level of the curve I until the end of the predetermined time interval V. Only after the end of the predetermined time interval V is the position of the claws A, F detected and assigned; this is evident from the low level in the curve I of FIG. 1. That at least one of the two shifting elements or claws A, F is not in an end position arises from the increased operating pressure curve III during the transient phase IV, until the beginning of the predetermined time interval V.

Preferably, the carrying out of the proposed method for the assignment of the initial position is implemented upon each engine start and/or every time after the transmission has become depressurized.

Modifications and variations can be made to the embodiments illustrated or described herein without departing from the scope and spirit of the invention as set forth in the appended claims.

REFERENCE SIGNS

I Curve of initial position not detected/detected and assigned
II Engine rotational speed curve
III Operating pressure curve
IV Transient phase
V Predetermined time interval
VI Pressure threshold or threshold value
A Positive-locking shifting element or claw
B Frictional-locking shifting element
C Frictional-locking shifting element
D Frictional-locking shifting element
E Frictional-locking shifting element
F Positive-locking shifting element or claw
VM Internal combustion engine
i_a Curve of the operating state of claw A
i_f Curve of the operating state of claw F
n_mot Engine rotational speed

The invention claimed is:

1. A method for recording an initial position of at least one positive-locking shifting element of a transmission of a vehicle, comprising:
    supplying fluid to the at least one positive-locking shifting element such that the at least one positive-locking shifting element is urged towards a first position;
    recording an operating pressure of the fluid supplied to the at least one positive-locking shifting element during said step of supplying; and
    assigning the initial position of the at least one positive-locking shifting element as the first position if the operating pressure of fluid supplied to the at least one positive-locking shifting element is less than a threshold pressure value for a predetermined time interval during said step of recording.

2. The method of claim 1, wherein the first position is a closed position or an open position of the at least one positive-locking shifting element.

3. The method of claim 1, further comprising terminating an initialization phase of the at least one positive-locking shifting element if the operating pressure of fluid supplied to the at least one positive-locking shifting element is less than the threshold pressure value for the predetermined time interval during said step of recording.

4. The method of claim 1, further comprising opening the at least one positive-locking shifting element if the operating pressure of fluid supplied to the at least one positive-locking shifting element is greater than the threshold pressure value after the predetermined time interval elapses.

5. The method of claim 4, further comprising detecting a defect with the at least one positive-locking shifting element if the operating pressure of fluid supplied to the at least one positive-locking shifting element is greater than the threshold pressure value after said step of opening.

6. The method of claim 1, wherein said step of recording comprises recording the operating pressure of fluid supplied to the at least one positive-locking shifting element after a transient time interval prior to the predetermined time interval.

7. The method of claim 1, wherein said steps of supplying, recording and assigning are repeated each time an engine of the vehicle is started or after the transmission is unpressurized.

8. The method of claim 1, wherein the transmission is a nine-speed automatic transmission.

* * * * *